Sept. 30, 1941.  E. SCHLUETER  2,257,538
EXPANDED FASTENING DEVICE
Filed April 26, 1938
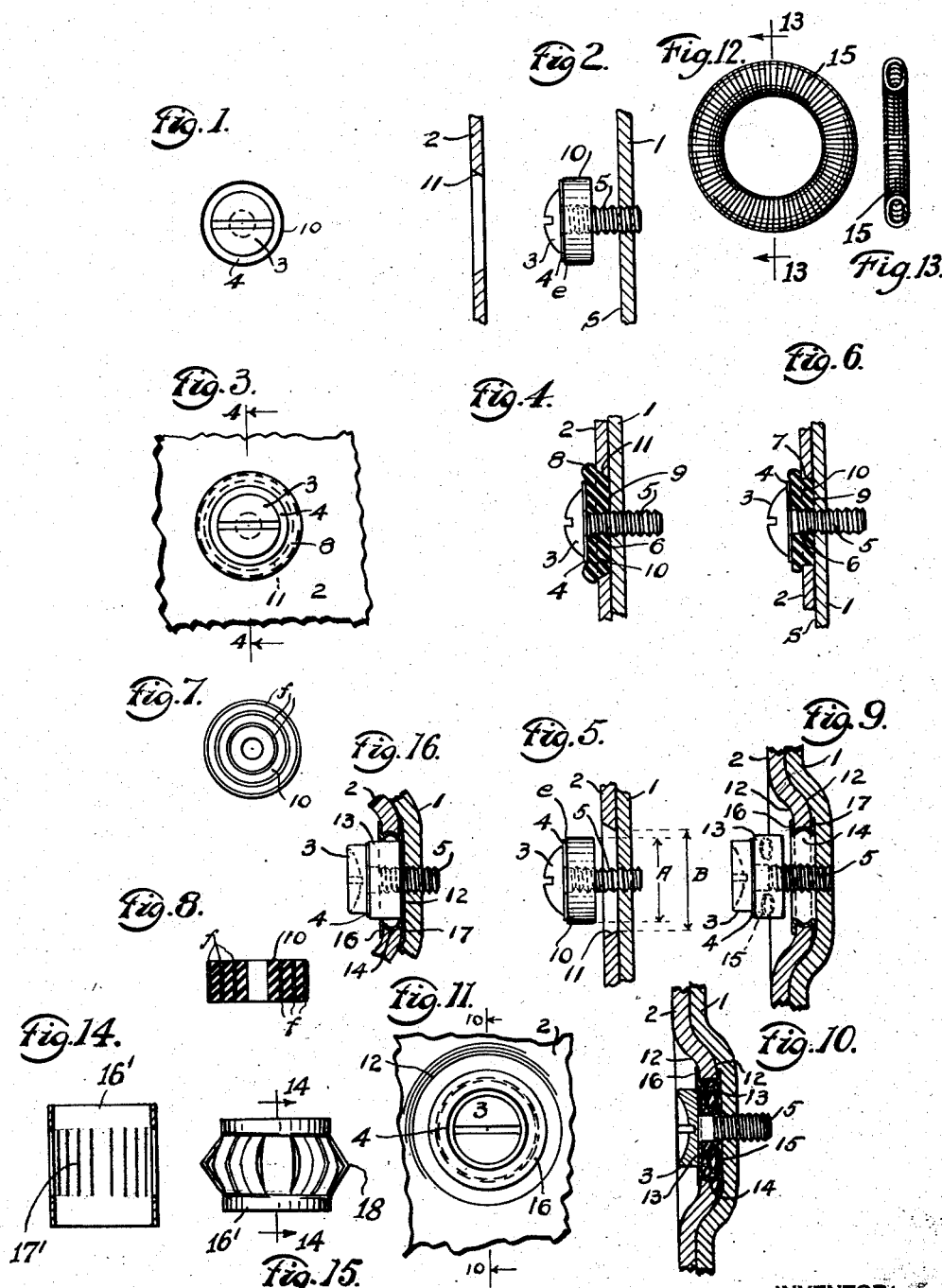
INVENTOR:
Ernest Schlueter,
BY
Harold D. Penney
ATTORNEY.

Patented Sept. 30, 1941

2,257,538

UNITED STATES PATENT OFFICE 2,257,538

EXPANDED FASTENING DEVICE

Ernest Schlueter, Jamaica, N. Y.

Application April 26, 1938, Serial No. 204,275

10 Claims. (Cl. 85—50)

The present invention relates to fastening means, whereby two component pieces may be detachably affixed to one another in firm assembly. One of the important features of the present device is the provision of a structure wherein the said means need not be, of itself, completely detached from the base piece to which the detachable piece is assembled, in order to remove the detachable piece.

Another important feature of the present means, is in the provision of an expandible member in the fastening unit, wherein compression of the expandable means translates the compression forces into radial gripping forces thereby, as will hereinafter appear, the detachable piece will be firmly locked to the base piece and held in operative assembly with a noiseless and substantially non-vibratory contact.

The parts forming the fastening assembly are simple, extremely efficient, and easily assembled.

Other features of advantage and improved function will appear as the herein description proceeds, and it will be obvious that modifications may be made in the structure herein disclosed without departing from the spirit hereof or the scope of the appended claims.

In the drawing,

Fig. 1 is a plan view of the locking assembly;

Fig. 2 is a side view of the locking parts in partial assembly, with the lockable plates in fragmentary section;

Fig. 3 is a fragmented plan view of Fig. 4;

Fig. 4 is an assembled, locked section taken on the line 4—4, Fig. 3, looking in the direction of the arrows;

Fig. 5 is a partially assembled fragmentary sectional view, similar to Fig. 4, before compression of the locking unit;

Fig. 6 is a view, similar to Fig. 4, showing a slight modification thereover;

Fig. 7 is a plan view of the compressible element;

Fig. 8 is a longitudinal sectional view of the element of Fig. 7;

Fig. 9 is a sectional view similar to Fig. 11 showing a modified form of fastening means;

Fig. 10 is a section view taken on the line 10—10, Fig. 11, looking in the direction of the arrows;

Fig. 11 is a fragmented plan view of the fastening means as shown in Fig. 10;

Fig. 12 is a plan view of the circular coiled spring filler;

Fig. 13 is a sectional view, taken on the line 13—13, Fig. 12, looking in the direction of the arrows;

Fig. 14 is a sectional view of a slitted cylinder;

Fig. 15 is a side view of Fig. 14, showing the slitted cylinder formed into an expanding filler; and Fig. 16 is a partially sectioned view of the modified fastening before compression is applied thereto.

The present device is not limited to the uses herein disclosed but has many other uses than herein set forth, and is particularly susceptible of finding a practical application in airplanes and especially in the attaching to the fuselage or body thereof of such specific attachable and detachable portions as fairings, cowlings and cover plates for inspection apertures.

In many instances a single plane, according to size, may have used in its construction, from three hundred, to a thousand of such fastening devices. At the present time there are a variety of special fasteners on the market for this specific purpose, but they are subject to mechanical, metal to metal contacts and loose fitting and therefore, due to critical speeds of the plane engine, they are subject to excessive vibration, which in time makes the fittings too loose to be efficient or cause failure of said fittings due to fatigue of the metal, from which they are made.

The present structure overcomes the above objectionable features, besides having advantageous features not possessed by fastening devices of current use, as will be later pointed out, in detail.

As shown in Figs. 3, 4, 5 and 6, in combination with a base plate 1, which may be any desired surface of the fuselage or any other part of the plane structure, has superposed thereover a detachable plate 2, which may be a cover or hatch plate or any other element detachably assembled to the base surface 1.

The base plate is provided with a tapped or threaded aperture into which is threadedly mounted the threaded end 5 of a screw which comprises a body portion 6 and a slotted head 3.

The detachable plate 2 is provided with an aperture 7, Fig. 6, or a counterbored aperture 11, Figs. 2, 3 and 5, which are larger than the tapped bore, and this larger bore exposes a portion of the surface S of base plate 1, which forms a circumferential recessed seat 9, about the axis of the tapped apertures.

Into the bores 7 or 11, and resting upon the seat 9 is inserted a short length of a flexible or resilient, preferably of textile reinforced rubber, ferrule 10. This ferrule 10 is exteriorly and preferably of cylindrical cross section, the outer diameter of which, when uncompressed and resting upon seat 9, is of lesser outside diameter than the bores 7 or 11, this being shown in Figs. 2 and 5. The ferrule 10 is molded with interiorly located textile reinforcements, Fig. 8.

Between the top surface of the ferrule 10 and underneath the shouldered head 3 of the screw 5, is located a washer 4, Figs. 2, 4, 5 and 6.

As shown in Fig. 5, the assembled parts 1, 2, with the ferrule moved from seat 9, and the washer and screw mounted are so associated that the detachable plate 2 may be removed from or replaced over the ferrule 10 due to the joint space between the outer diameters of the washer and ferrule and the inner diameter of the bores 7 or 11, as shown at A—B, Fig. 5.

As shown in Figs. 2 and 5, it is obvious that the detachable plate 2 may be replaced or removed from the fasteners, when the compression screw and uncompressed ferrule 10 are in the positions and condition there shown.

When it is desired to fix the fastening devices to rigidly hold the cover plate 2, or its equivalent, to the base plate 1, the screws are screwed down so as to compress the ferrules 10, as shown in Figs. 3, 4 and 6. The screws may be screwed in very tightly and the washer permits the screw head to revolve upon the top of the ferrule without tendency to twist the ferrule due to friction therebetween. As the screw compresses the ferrule, it is placed under such compressive forces as tend to expand the body thereof against the bores 7 or 11, in plate 2, and to reactively expand against the body or shank of the screw, and to develop resistance forces under the washer 10 and head 3 of the screw. The tighter the screw is driven home, the more the three compression forces grip the screw, and thus firmly hold the same against accidental loosening and unscrewing by vibrations set up by the plane engine, under any rotative speed.

The compressive action of the screw and washer also perform another function, as disclosed in Figs. 3, 4 and 6, wherein the fastening assembly is shown fully compressed, and the upper end excess of the ferrule 10 is shown as being extruded away from the washer edge and thus forms a retention bead 8 which overlies the outer perimeter of apertures 7 or 11, on the top surface of detachable plate 2, and thus forms, with the washer, an annular plate locking overhang.

To further reinforce this plate locking of the detachable plate 2, the aperture 11 may be angularly countersunk as shown in Figs. 4 and 5, and thus the countersunk aperture and the locking overhang 8, together, form a means for positively holding the plate 2, to the base plate 1, under compression. Further, if it so happens that the threaded aperture in the base plate and the apertures 7 or 11 in the detachable plate are out of axial alinement, the ferrule will accommodate itself to this misalinement, without loss of efficiency, when compressed.

From the foregoing, it is obvious that when it is desired to detach the hatch plate from the base plate, a screw driver may be used to loosen only the screw 10 until the ferrule 10 regains its original uncompressed position, and that no parts of the fastening elements need be removed from their operative positions in the base plate to unlock and remove plate 2.

This feature is a distinct advantage, because it obviates the time and labor of the removal of any part of the fastening means from the material to which it is applied, and its subsequent reinstatement, thus saving labor, and eliminating the possibility of losing any part of the fastening means, both of these advantages being not found in current devices of this nature.

It will be also obvious that the ferrule 10 when in operative fastening assembly, as shown in Figs. 4 and 6 act to dampen out any vibratory action of the base and detachable plate, and to act also to keep out rain or moisture from the assembled and fastened elements.

The screw, ferrule and washer may be furnished for sale as an assembled article of manufacture, with the screw, ferrule and washer mounted together, or they may be furnished unassembled.

In the modified form shown in Figs. 9 to 16 inclusive, there is disclosed a structure the details of which are similar in function, and which, while this modification is stronger in it resistance to failure than the form shown in Figs. 1 to 8, it also has a feature of being depressed below the external surfaces of the fuselage, and thus become stream-lined and eliminate the air friction encountered where the head portions of the fastening are located above the surface lines of the fuselage or cover plate.

To this end, the base plate 1 and the detachable plate 2 are both depressed inwardly as at 12, Figs. 9, 10 and 16, so that the fastening assembly, when in operative position, as shown in Fig. 10, lies flush with or below the surrounding outer face of the cover plate 2.

The cover plate is provided with an aperture, the circular edge of which, Figs. 9, 10 and 16, is bounded by a grommet or eyelet, the inner perimeter of which is concaved, as at 14, and has means, such as flanges 16—17 to engage on opposite faces of the cover plate 2, thereby to lock the grommet thereto. Aside from the grommet and its seat 14 and the depressions 12 in the plates 1 and 2, these functions exactly as described for the plates and apertures of Figs. 4, 5 and 6.

The base plate 1, Figs. 9, 10 and 16, threaded to receive the threaded shank 5 of the headed screw 3, this latter having a recessed head, into which is cut the screw driver slot, to further enhance the stream lining of the fastening.

The resilient bushing 13, like bushing 10 of Fig. 8, may be made of rubber or a suitable rubber substitute, and has moulded therein a resilient metallic filler, such as an endless coiled wire spring 15, Fig. 12, which is made from a length of coiled spring, the ends of which are interengaged, to form an annular resilient member 15, and which is then slightly flattened into an ovate cross section as shown in Fig. 13.

Thereafter the spring is moulded into the rubber bushing 13, the finished diameter of which is enough smaller than the inner diameter of the grommet 12—14, as will be seen in Figs. 9 and 16, so that the grommet, will readily enter the grommet aperture, when uncompressed.

A friction eliminating washer 4 is located between the head of the screw 3 and the adjacent face of the bushing 13, to function the same as washer 4 of Figs. 4 and 6.

When the plates 1 and 2 are assembled together, and the screw 3 screwed inwardly, the bushing 13 is compressed causing it to bulge, or expand at its outer perimeter into the concave grommet seat 14, as seen in Fig. 10. This compression action also expands the inner filler spring 15, until its outer perimeter is substantially extended within the confines of the concave seat 14 of the grommet. The screw may be screwed down tightly, as shown in Fig. 10, until the washer 4 and the screw head enter the grommet aperture, the proportions of component parts of this modification thus eliminating the keying bead or lip 8, of Figs. 4 and 6, and substituting therefore the coiled spring filler for the desired key action.

In Figs. 14 and 15 is disclosed another form of expanding metal filler 16 as a substitute for spring 15. This filler 16 is made by slitting a cylindrical metallic tube with a plurality of slits 17, Fig. 14, said slits terminating short of the ends of the cylinder.

The expander is completed by forcing the ribs formed by said slitting outwardly, thus expanding the central portion 18, and contracting the ends of the cylinder towards each other. When this form of expander is used in the bushing 13, compression by the screw increases the central diameter 18, so that it performs the same functions as the annular spring filler 15.

The features, functions and advantages of the modified fastener, just above described, are the same as those described for the fastener of Figs. 1 to 7 inclusive.

Having thus described the invention what is claimed is:

1. A fastening device for detachably affixing plural elements together, comprising in combination, a base element and a detachable element, a threaded bore in one of said elements, an expansion bore in another of said elements, said latter bore being angularly countersunk, being of larger diameter than said threaded bore and being axially aligned with said threaded bore and forming a recessed seat, an apertured, compressive cylindrical ferrule of smaller external diameter than said expansion bore, but larger in diameter than said threaded bore mounted in said seat and means in said threaded bore for compressively expanding said ferrule to lockably engage the wall of said expanded bore.

2. In combination, a base member, a detachable plate having an opening, a headed screw, said member having therein an indentation of certain depth, there being a bore in the indented part for the shank of the screw; the plate being also indented around the opening so as to fit into said indentation; and an expansible ferrule on said shank and normally seated between the inner face of the screw head and the face of said member around the bore, whereby when the screw is turned home the ferrule may completely fill the opening, said head having its outermost face flush with the outer face of said plate around its depression.

3. In combination, a base plate having a bore with a surrounding inward depression, a second plate having a relatively large opening with a surrounding depression filling into the first depression, a headed screw having its stem turnable in the bore, resilient contractile means engaged around the shank between the base plate at its bore and the inner face of the screw head, said means filling said opening, and a preformed opposite outer face on said head, said latter face having substantial flush alignment with the outer face of said second plate around its depression.

4. In combination, an expansible member; a pair of superposed plates, one plate having a face and the second plate only having therein an opening large enough to receive the member; said member being in said opening and adapted to expand laterally when compressed perpendicularly toward the first plate; and means secured to said member and first plate, for securing the expansible member to the face-carrying plate and compressing said expansible member in a direction to cause the expansible member to expand laterally into holding engagement with the wall of the opening.

5. In combination, a pair of superposed members one member having a face and the other member having an opening therein having a concaved wall forming an annular groove around the opening; an expansible member in said opening adapted to expand laterally when compressed toward said face; and means for securing the expansible member to the face-carrying member and compressing said expansible member toward said face to cause the expansible member to expand laterally into holding engagement within said groove.

6. In combination, a pair of superposed members one member having a face and the other member being a plate and having an opening therein; an eyelet secured in said opening having an annular groove therearound open toward the center of the opening; an expansible member in said eyelet adapted to expand laterally when compressed toward said face; and means for securing the expansible member to the face-carrying member and compressing said expansible member toward said face to cause the expansible member to expand laterally into holding engagement within said groove.

7. In combination, a member having a face having a threaded aperture therein; a plate disposed against said face and having an opening within which the axis of the aperture passes; a molded expansible rubber like disk-member axially disposed in said opening and adapted to expand laterally into holding engagement with the wall of the opening when compressed toward said face; a screw having threaded engagement in said aperture and having its head adapted to apply pressure against the outer face of the disk to compress the disk toward said first named face to cause the disk to expand into holding engagement with the walls of said opening; and a resilient metallic filler in said disk member adapted to expand laterally as the disk expands laterally.

8. In a combination as in claim 7, said filler comprising an endless coiled wire spring molded coaxially in said disk member and spaced from said screw and all faces of the disk, and adapted to expand laterally as the disk expands laterally.

9. In a combination as in claim 7, said filler comprising a resilient metallic tube molded in said disk member coaxially thereof and spaced from said screw and all faces of the disk-member, and provided with a plurality of longitudinal slits terminating short of both ends of the tube and intermediately bendable laterally outwardly when the disk expands laterally.

10. In combination, an expansible member; a member having a face; a plate superposed on said face; said plate only having therein an opening large enough to receive the expansible member; said expansible member being in said opening and adapted to expand laterally when compressed toward the first plate; and means secured to said members for securing the expansible member to the face-carrying member and compressing said expansible member in a direction to cause the expansible member to expand laterally into holding engagement with the wall of the opening.

ERNEST SCHLUETER.